US012593239B2

(12) United States Patent
Ma et al.

(10) Patent No.: US 12,593,239 B2
(45) Date of Patent: Mar. 31, 2026

(54) SERVICE DATA FLOW TRANSMISSION METHOD, COMMUNICATION APPARATUS, AND COMMUNICATION SYSTEM

(71) Applicant: HUAWEI TECHNOLOGIES CO., LTD., Shenzhen (CN)

(72) Inventors: Jingwang Ma, Shanghai (CN); Yu Zhou, Shanghai (CN); Chuan Ma, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 402 days.

(21) Appl. No.: 18/191,211

(22) Filed: Mar. 28, 2023

(65) Prior Publication Data

US 2023/0239728 A1     Jul. 27, 2023

Related U.S. Application Data

(63) Continuation of application No. PCT/CN2020/119473, filed on Sep. 30, 2020.

(51) Int. Cl.
*H04W 28/02*        (2009.01)
*H04W 28/12*        (2009.01)

(52) U.S. Cl.
CPC ...  *H04W 28/0268* (2013.01); *H04W 28/0263* (2013.01); *H04W 28/12* (2013.01)

(58) Field of Classification Search
None
See application file for complete search history.

(56) References Cited

U.S. PATENT DOCUMENTS

| | | | | |
|---|---|---|---|---|
| 2019/0166014 A1* | 5/2019 | Li | ........................ | H04L 41/5003 |
| 2019/0230693 A1* | 7/2019 | Li | ..................... | H04W 72/1263 |
| 2019/0364541 A1* | 11/2019 | Ryu | ...................... | H04W 80/10 |
| 2021/0144096 A1* | 5/2021 | Plat | ..................... | H04L 47/2416 |
| 2021/0352534 A1* | 11/2021 | Tiwari | ................ | H04L 41/5009 |
| 2022/0053476 A1* | 2/2022 | Aksu | ................. | H04W 28/0215 |

FOREIGN PATENT DOCUMENTS

EP          3552348 B1    10/2020

OTHER PUBLICATIONS

3GPP TS 23.501, 3rd Generation Partnership Project; Technical Specification Group Services and System Aspects; System architecture for the 5G System (5GS); Stage 2, 3GPP Organizational Partners (ARIB, ATIS, CCSA, ETSI, TSDSI, TTA, TTC), Sep. 2020, vol. 16.6.0, No. 16, 447 pages.

* cited by examiner

*Primary Examiner* — Eunsook Choi
(74) *Attorney, Agent, or Firm* — Maier & Maier, PLLC

(57)                ABSTRACT
A service data flow transmission method, a communication apparatus, and a communication system. The method includes: a user plane network element receives characteristic information of a service data flow and QoS information of the service data flow, where the characteristic information of the service data flow indicates traffic characteristic information corresponding to different time slices of the service data flow in a time period, and the QoS information indicates QCIs corresponding to the different time slices; determines, based on the characteristic information of the service data flow, a first time slice corresponding to a data packet of the service data flow; and sends the data packet to an access network device based on the first time slice corresponding to the data packet of the service data flow and a QCI corresponding to the first time slice.

20 Claims, 6 Drawing Sheets

SERVICE DATA FLOW TRANSMISSION METHOD, COMMUNICATION APPARATUS, AND COMMUNICATION SYSTEM

CROSS REFERENCE TO RELATED APPLICATIONS

This application is a continuation of International Patent Application No. PCT/CN2020/119473, filed on Sep. 30, 2020, the disclosure of which is hereby incorporated by reference in its entirety.

TECHNICAL FIELD

The embodiments relate to the field of communication technologies, a service data flow transmission method, a communication apparatus, and a communication system.

BACKGROUND

Currently, a service data flow (SDF) is mapped to a quality of service (QoS) flow, and QoS guarantee is performed on the QoS flow by using a fixed QoS class identifier (QCI). In other words, one service data flow corresponds to a type of fixed QoS guarantee.

However, some current services (such as video services) may have a large data volume and a high requirement on a delay in some time periods and have a small data volume and a low requirement on the delay in other time periods. Currently, there is no corresponding method for performing QoS control on this type of service to improve transmission performance of a service data flow.

SUMMARY

The embodiments may provide a service data flow transmission method, a communication apparatus, and a communication system, to provide an appropriate QoS guarantee mechanism for a single service data flow, to improve transmission performance of the service data flow.

According to a first aspect, an embodiment may provide a service data flow transmission method, including: A user plane network element receives characteristic information of a service data flow and quality of service (QoS) information of the service data flow, where the characteristic information of the service data flow indicates traffic characteristic information corresponding to different time slices of the service data flow in a time period, and the QoS information indicates QoS class identifiers (QCIs) corresponding to the different time slices; the user plane network element determines, based on the characteristic information of the service data flow, a first time slice corresponding to a data packet of the service data flow; and the user plane network element sends the data packet based on the first time slice corresponding to the data packet of the service data flow and a QCI corresponding to the first time slice.

Herein, that the user plane network element sends the data packet may be, for example, that the user plane network element sends the data packet to an access network device through an interface between the user plane network element and the access network device or may be that the user plane network element sends the data packet to an access network device through an intermediate node (for example, another user plane network element).

Based on the foregoing solution, a plurality of QCIs may be configured for a single service data flow, and corresponding QoS guarantee is performed on data packets in different time slices based on the corresponding QCIs. This may implement flexibility of service data flow control and may meet QoS control requirements of the single service data flow in different time periods. Therefore, transmission performance of the service data flow can be improved.

In a possible implementation method, the characteristic information includes a time period, at least two time slices corresponding to the time period, and bit rates corresponding to the at least two time slices, the QoS information includes a QoS flow identifier (QFI) and QCIs corresponding to the at least two time slices, the QCIs corresponding to the at least two time slices are not completely the same, and there is a mapping relationship between the service data flow and a QoS flow corresponding to the QFI. The user plane network element determining, based on the characteristic information of the service data flow, a first time slice corresponding to a data packet of the service data flow may include: The user plane network element determines, based on the characteristic information of the service data flow and a first bit rate of the data packet of the service data flow, the first time slice that is in the at least two time slices and that corresponds to the first bit rate.

Based on the foregoing solution, the user plane network element may determine, by identifying a bit rate of the data packet, a time slice corresponding to the bit rate, to determine a time slice corresponding to the data packet. In this method, the time slice corresponding to the data packet may be quickly determined, and a data transmission capability may be improved.

In a possible implementation method, the user plane network element determining, based on the characteristic information of the service data flow and a first bit rate of the data packet of the service data flow, the first time slice that is in the at least two time slices and that corresponds to the first bit rate may include: The user plane network element determines, based on the characteristic information, a boundary (which may also be referred to as a start point) of a time period of the data packet; and the user plane network element determines, based on at least two time slices corresponding to the time period, bit rates corresponding to the at least two time slices, and the first bit rate, the first time slice corresponding to the first bit rate.

In a possible implementation method, the user plane network element sending the data packet based on the first time slice corresponding to the data packet of the service data flow and a QCI corresponding to the first time slice may include: The user plane network element adds the QFI and the first QCI to the data packet, and sends the data packet that carries the QFI and the first QCI, where the first QCI is the QCI corresponding to the first time slice in the QCIs corresponding to the at least two time slices.

Based on this solution, the user plane network element may include a QCI corresponding to the data packet in the data packet for sending, so that a network element on a receiving side can directly obtain the QCI corresponding to the data packet from the data packet and perform QoS control on the data packet based on the QCI. This quickly determines a QoS control policy corresponding to the data packet and helps improve data transmission quality.

In a possible implementation method, the user plane network element adds the QFI and the first QCI to a header of the data packet.

In a possible implementation method, the characteristic information of the service data flow is from an application server; the characteristic information of the service data flow is from a database, and the characteristic information of the service data flow in the database is from an application server; or the characteristic information of the service data flow is from a session management network element, and the characteristic information of the service data flow in the session management network element is from an application server.

According to a second aspect, an embodiment may provide a service data flow transmission method, including: An access network device receives characteristic information of a service data flow and quality of service (QoS) information of the service data flow, where the characteristic information of the service data flow indicates traffic characteristic information corresponding to different time slices of the service data flow in a time period, and the QoS information indicates QoS class identifiers (QCIs) corresponding to the different time slices; the access network device determines, based on the characteristic information and the QoS information of the service data flow, a configuration parameter corresponding to a data packet of the service data flow; and the access network device sends the data packet to a terminal device based on the configuration parameter.

Based on the foregoing solution, a plurality of QCIs may be configured for a single service data flow, and corresponding QoS guarantee is performed on data packets in different time slices based on the corresponding QCIs. This may implement flexibility of service data flow control and may meet QoS control requirements of the single service data flow in different time periods. Therefore, transmission performance of the service data flow can be improved.

In a possible implementation method, the characteristic information includes a time period, at least two time slices corresponding to the time period, and bit rates corresponding to the at least two time slices, the QoS information includes a QFI and QCIs corresponding to the at least two time slices, the QCIs corresponding to the at least two time slices are not completely the same, and there is a mapping relationship between the service data flow and a QoS flow corresponding to the QFI. The access network device determining, based on the characteristic information and the QoS information of the service data flow, a configuration parameter corresponding to a data packet of the service data flow may include: The access network device determines, based on the characteristic information of the service data flow and a first bit rate of the data packet of the service data flow, a first time slice that is in the at least two time slices and that corresponds to the first bit rate; the access network device determines a first QCI corresponding to the first time slice in the QCIs corresponding to the at least two time slices; and the access network device determines that a configuration parameter corresponding to the first QCI is the configuration parameter corresponding to the data packet of the service data flow.

Based on the foregoing solution, the configuration parameter corresponding to the data packet may be quickly determined, and a data transmission capability may be improved.

In a possible implementation method, the configuration parameter includes one or more of the following information: a sending rate, a packet loss rate, a packet delay budget, and a priority.

In a possible implementation method, the access network device determines, based on reported channel state information (CSI), a sending occasion and a subcarrier that are occupied for sending the data packet. The access network device sending the data packet to a terminal device based on the configuration parameter may include: The access network device sends, based on the configuration parameter corresponding to the first QCI, the data packet to the terminal device at the sending occasion occupied by the data packet and on the subcarrier occupied by the data packet.

Based on the foregoing solution, the access network device may determine, based on the CSI reported by the terminal device, the sending occasion and the subcarrier for sending a data packet. This may improve data transmission efficiency.

In a possible implementation method, the access network device sends configuration information to the terminal device, where the configuration information includes indication information and the time period, and the indication information indicates that a period of reporting the channel state information (CSI) by the terminal device is the same as the time period; and the access network device receives the CSI from the terminal device.

In a possible implementation method, the indication information further indicates the terminal device to report the CSI in first duration before a moment at which the data packet arrives.

In a possible implementation method, the access network device determines arrival time of the data packet based on the time period; the access network device sends downlink control information (DCI) to the terminal device in second duration before a moment at which the data packet arrives, where the DCI indicates the terminal device to report the CSI; and the access network device receives the CSI from the terminal device.

In a possible implementation method, the characteristic information of the service data flow is from an application server; the characteristic information of the service data flow is from a database, and the characteristic information of the service data flow in the database is from an application server; or the characteristic information of the service data flow is from a session management network element, and the characteristic information of the service data flow in the session management network element is from an application server.

According to a third aspect, an embodiment may provide a service data flow transmission method, including: An access network device receives a data packet of a quality of service (QoS) flow from a user plane network element, where a header of the data packet carries a quality of service QoS flow identifier (QFI) and a QoS class identifier (QCI), and the QFI identifies the QoS flow; and the access network device sends the data packet to a terminal device based on a configuration parameter corresponding to the QCI.

In a possible implementation method, the access network device receives QoS information of a service data flow from a session management network element, where the QoS information includes the QFI, the QCI, and the configuration parameter corresponding to the QCI, and there is a mapping relationship between the service data flow and the QoS flow; and the access network device obtains, based on the QoS information, the configuration parameter corresponding to the QCI.

In a possible implementation method, the configuration parameter includes one or more of the following: a bit rate, a packet loss rate, a packet delay budget, and a priority.

According to a fourth aspect, an embodiment may provide a service data flow transmission method, including: A session management network element sends characteristic information of a service data flow and quality of service (QoS) information of the service data flow to a user plane network element, where the characteristic information of the service data flow indicates traffic characteristic information corresponding to different time slices of the service data flow in a time period, and the QoS information indicates QoS class identifiers (QCIs) corresponding to the different time slices. The characteristic information of the service data flow may enable the user plane network element to determine, based on the characteristic information of the service data flow, a first time slice corresponding to a data packet of the service data flow; and send the data packet based on the first time slice corresponding to the data packet of the service data flow and a QCI corresponding to the first time slice.

According to a fifth aspect, an embodiment may provide a service data flow transmission method, including: A session management network element sends characteristic information of a service data flow and quality of service (QoS) information of the service data flow to an access network device, where the characteristic information of the service data flow indicates traffic characteristic information corresponding to different time slices of the service data flow in a time period, and the QoS information indicates QoS class identifiers (QCIs) corresponding to the different time slices. The characteristic information of the service data flow may enable the access network device to determine, based on the characteristic information and the QoS information of the service data flow, a configuration parameter corresponding to a data packet of the service data flow, and send the data packet to a terminal device based on the configuration parameter.

In a possible implementation method of the fourth aspect or the fifth aspect, the session management network element receives the characteristic information of the service data flow and the QoS information of the service data flow from a policy control network element.

According to a sixth aspect, an embodiment may provide a communication apparatus.

The apparatus may be a user plane network element or may be a chip used in a user plane network element. The apparatus has a function of implementing the first aspect or the possible implementation methods of the first aspect. The function may be implemented by hardware or may be implemented by hardware executing corresponding software. The hardware or the software includes one or more modules corresponding to the function.

According to a seventh aspect, an embodiment may provide a communication apparatus. The apparatus may be an access network device or may be a chip of an access network device. The apparatus has a function of implementing the second aspect, the third aspect, the possible implementation methods of the second aspect, or the possible implementation methods of the third aspect. The function may be implemented by hardware or may be implemented by hardware executing corresponding software. The hardware or the software includes one or more modules corresponding to the function.

According to an eighth aspect, an embodiment may provide a communication apparatus. The apparatus may be a session management network element or may be a chip of a session management network element. The apparatus has a function of implementing the method in the fourth aspect, the fifth aspect, the possible implementation methods of the fourth aspect, or the possible implementation methods of the fifth aspect. The function may be implemented by hardware or may be implemented by hardware executing corresponding software. The hardware or the software includes one or more modules corresponding to the function.

According to a ninth aspect, an embodiment may provide a communication apparatus, including a processor and a memory. The memory is configured to store computer-executable instructions. When the apparatus runs, the processor executes the computer-executable instructions stored in the memory, so that the apparatus performs any method in the first aspect to the fifth aspect and the possible implementation methods of the first aspect to the fifth aspect.

According to a tenth aspect, an embodiment may provide a communication apparatus, including units or elements configured to perform the steps of any method in the first aspect to the fifth aspect and the possible implementation methods of the first aspect to the fifth aspect.

According to an eleventh aspect, an embodiment may provide a communication apparatus, including a processor and an interface circuit. The processor is configured to: communicate with another apparatus through the interface circuit and perform any method in the first aspect to the fifth aspect and the possible implementation methods of the first aspect to the fifth aspect. There may be one or more processors.

According to a twelfth aspect, an embodiment may provide a communication apparatus, including a processor. The processor is configured to: be connected to a memory, and invoke a program stored in the memory, to perform any method in the first aspect to the fifth aspect and the possible implementation methods of the first aspect to the fifth aspect. The memory may be located inside or outside the apparatus. There may be one or more processors.

According to a thirteenth aspect, an embodiment may further provide a non-transitory computer-readable storage medium. The non-transitory computer-readable storage medium stores instructions. When the instructions are run on a computer, a processor is enabled to perform any method in the first aspect to the fifth aspect and the possible implementation methods of the first aspect to the fifth aspect.

According to a fourteenth aspect, an embodiment may further provide a computer program product. The computer product includes a computer program. When the computer program is run, any method in the first aspect to the fifth aspect and the possible implementation methods of the first aspect to the fifth aspect is enabled to be performed.

According to a fifteenth aspect, an embodiment may further provide a chip system, including a processor. The processor is configured to perform any method in the first aspect to the fifth aspect and the possible implementation methods of the first aspect to the fifth aspect.

According to a sixteenth aspect, an embodiment may further provide a communication system, including a user plane network element and a receiving network element. The user plane network element is configured to: receive characteristic information of a service data flow and quality of service (QoS) information of the service data flow from a session management network element, where the characteristic information of the service data flow indicates traffic characteristic information corresponding to different time slices of the service data flow in a time period, and the QoS information indicates QoS class identifiers (QCIs) corresponding to the different time slices; determine, based on the characteristic information of the service data flow, a first time slice corresponding to a data packet of the service data flow; and send the data packet to the receiving network element based on the first time slice corresponding to the data packet of the service data flow and a QCI corresponding to the first time slice. The receiving network element is configured to receive the data packet from the user plane network element.

According to a seventeenth aspect, an embodiment may further provide a communication system, including an access network device and a session management network element. The session management network element is configured to send characteristic information of a service data flow and quality of service (QoS) information of the service data flow to the access network device, where the characteristic information of the service data flow indicates traffic characteristic information corresponding to different time slices of the service data flow in a time period, and the QoS information indicates QoS class identifiers (QCIs) corresponding to the different time slices. The access network device is configured to: receive the characteristic information of the service data flow and the QoS information of the service data flow from the session management network element; determine, based on the characteristic information and the QoS information of the service data flow, a configuration parameter corresponding to a data packet of the service data flow; and send the data packet to a terminal device based on the configuration parameter.

DETAILED DESCRIPTION OF THE EMBODIMENTS

The following further describes the embodiments in detail with reference to the accompanying drawings. An operation in method embodiments may also be applied to an apparatus embodiment or a system embodiment. In the descriptions, unless otherwise specified, "a plurality of" means two or more than two.

Figures 1A, 1B, 2A:
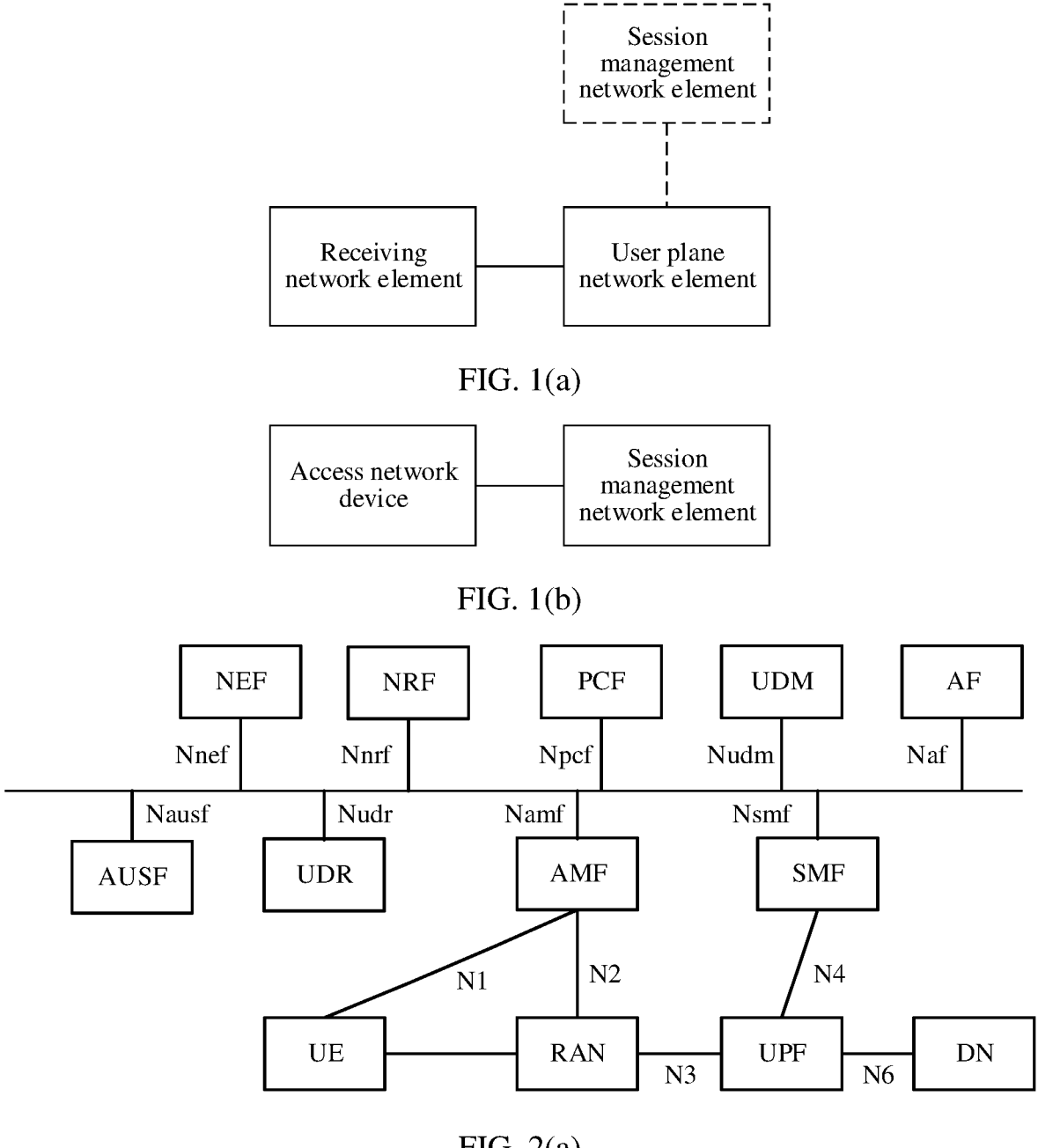
FIG. 1(a) is a schematic diagram of a communication system according to an embodiment.
FIG. 1(b) is a schematic diagram of another communication system according to an embodiment.
FIG. 2(a) is a schematic diagram of a 5G network architecture based on a service-based architecture.

To resolve the problem mentioned in the background, as shown in FIG. 1(a), the embodiments may provide a communication system. The system includes an access network device and a user plane network element. Optionally, the system further includes a session management network element.

The user plane network element is configured to: receive characteristic information of a service data flow and quality of service (QoS) information of the service data flow from the session management network element, where the characteristic information of the service data flow indicates traffic characteristic information corresponding to different time slices of the service data flow in a time period, and the QoS information indicates QoS class identifiers (QCIs) corresponding to the different time slices; determine, based on the characteristic information of the service data flow, a first time slice corresponding to a data packet of the service data flow; and send the data packet to a receiving network element based on the first time slice corresponding to the data packet of the service data flow and a QCI corresponding to the first time slice. The receiving network element is configured to receive the data packet from the user plane network element.

In an implementation, the receiving network element may be an access network device, or may be another user plane network element, or may be another network element in a network. This is not limited herein.

In a possible implementation method, the characteristic information includes a time period, at least two time slices corresponding to the time period, and bit rates corresponding to the at least two time slices, the QoS information includes a QoS flow identifier (QFI) and QCIs corresponding to the at least two time slices, the QCIs corresponding to the at least two time slices are not completely the same, and there is a mapping relationship between the service data flow and a QoS flow corresponding to the QFI. The user plane network element may be configured to determine, based on the characteristic information of the service data flow. The first time slice corresponding to the data packet of the service data flow may further include: The user plane network element is configured to determine, based on the characteristic information of the service data flow and a first bit rate of the data packet of the service data flow, the first time slice that is in the at least two time slices and that corresponds to the first bit rate.

In a possible implementation method, the user plane network element may be configured to determine, based on the characteristic information of the service data flow and a first bit rate of the data packet of the service data flow. The first time slice that is in the at least two time slices and that corresponds to the first bit rate may further include: The user plane network element is configured to: determine, based on the characteristic information, a boundary of a time period of the data packet; and determine, based on at least two time slices corresponding to the time period, bit rates corresponding to the at least two time slices, and the first bit rate, the first time slice corresponding to the first bit rate.

In a possible implementation method, the user plane network element may be configured to send the data packet to the receiving network element based on the first time slice corresponding to the data packet of the service data flow. The QCI corresponding to the first time slice may include: The user plane network element is configured to add the QFI and the first QCI to the data packet, and send the data packet that carries the QFI and the first QCI to the receiving network element, where the first QCI is the QCI corresponding to the first time slice in the QCIs corresponding to the at least two time slices.

In a possible implementation method, the user plane network element being configured to add the QFI and the first QCI to the data packet may include: The user plane network element is configured to add the QFI and the first QCI to a header of the data packet.

In a possible implementation method, the session management network element is configured to: receive the characteristic information of the service data flow and the QoS information of the service data flow from a policy control network element; and send the characteristic information of the service data flow and the QoS information of the service data flow to the user plane network element.

Implementations of the foregoing solutions are described in detail in the following method embodiments. Details are not described herein.

Figure 2B:
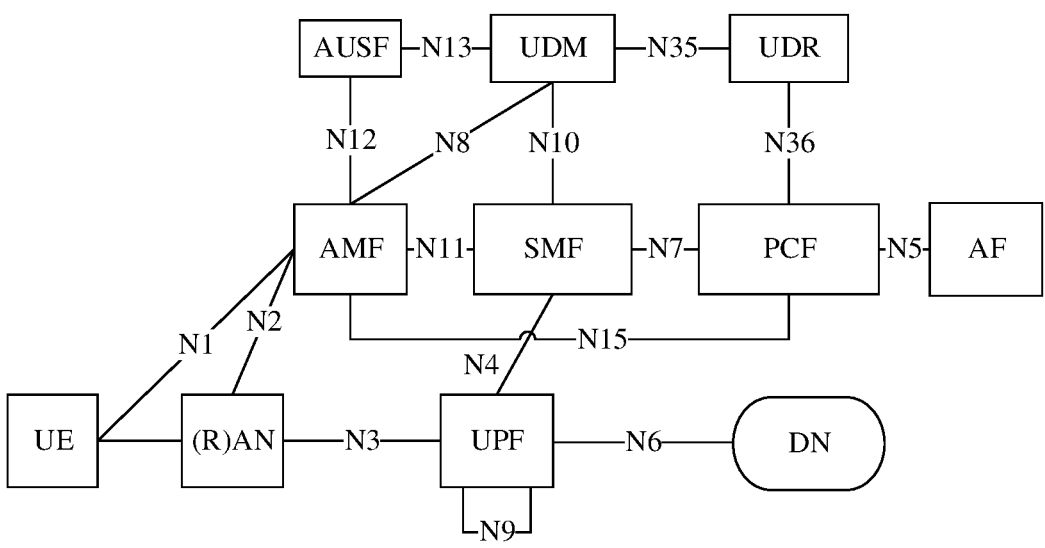
FIG. 2(b) is a schematic diagram of a 5G network architecture based on a point-to-point interface.

The system shown in FIG. 1(a) may be used in a fifth generation (5G) network architecture shown in FIG. 2(a) or FIG. 2(b), or may be used in a future network architecture, for example, a sixth generation (6G) network architecture. This is not limited.

To resolve the problem mentioned in the background, as shown in FIG. 1(b), the embodiments may provide a communication system. The system includes an access network device and a session management network element.

The session management network element is configured to send characteristic information of a service data flow and quality of service (QoS) information of the service data flow to the access network device, where the characteristic information of the service data flow indicates traffic characteristic information corresponding to different time slices of the service data flow in a time period, and the QoS information indicates QoS class identifiers (QCIs) corresponding to the different time slices. The access network device is configured to: receive the characteristic information of the service data flow and the QoS information of the service data flow from the session management network element; determine, based on the characteristic information and the QoS information of the service data flow, a configuration parameter corresponding to a data packet of the service data flow; and send the data packet to a terminal device based on the configuration parameter.

In a possible implementation method, the characteristic information includes a time period, at least two time slices corresponding to the time period, and bit rates corresponding to the at least two time slices, the QoS information includes a QFI and QCIs corresponding to the at least two time slices, the QCIs corresponding to the at least two time slices are not completely the same, and there is a mapping relationship between the service data flow and a QoS flow corresponding to the QFI. The access network device being configured to determine, based on the characteristic information and the QoS information of the service data flow, the configuration parameter corresponding to the data packet of the service data flow may include: The access network device is configured to: determine, based on the characteristic information of the service data flow and a first bit rate of the data packet of the service data flow, a first time slice that is in the at least two time slices and that corresponds to the first bit rate; determine a first QCI corresponding to the first time slice in the QCIs corresponding to the at least two time slices; and determine that a configuration parameter corresponding to the first QCI is the configuration parameter corresponding to the data packet of the service data flow.

In a possible implementation method, the configuration parameter includes one or more of the following information: a sending rate, a packet loss rate, a packet delay budget, and a priority.

In a possible implementation method, the access network device is further configured to determine, based on reported channel state information (CSI), a sending occasion and a subcarrier that are occupied for sending the data packet. The sending the data packet to the terminal device based on the configuration parameter corresponding to the first QCI includes: sending, based on the configuration parameter corresponding to the first QCI, the data packet to the terminal device at the sending occasion occupied by the data packet and on the subcarrier occupied by the data packet.

In a possible implementation method, the access network device is further configured to: send configuration information to the terminal device, where the configuration information includes indication information and the time period, and the indication information indicates that a period of reporting the channel state information (CSI) by the terminal device is the same as the time period; and receive the CSI from the terminal device.

In a possible implementation method, the indication information further indicates the terminal device to report the CSI in first duration before a moment at which the data packet arrives.

In a possible implementation method, the access network device is further configured to determine arrival time of the data packet based on the time period; send downlink control information (DCI) to the terminal device in second duration before a moment at which the data packet arrives, where the DCI indicates the terminal device to report the CSI; and receive the CSI from the terminal device.

Implementations of the foregoing solutions are described in detail in the following method embodiments. Details are not described herein.

The system shown in FIG. 1(b) may be used in the 5G network architecture shown in FIG. 2(a) or FIG. 2(b), and may also be used in the future network architecture, for example, the 6G network architecture. This is not limited.

For example, it is assumed that the communication system shown in FIG. 1(a) or FIG. 1(b) is used in the 5G network architecture. FIG. 2(a) is a schematic diagram of a 5G network architecture based on a service-based architecture. A network element or an entity corresponding to the user plane network element in FIG. 1(a) may be a user plane function (user plane function, UPF) network element in the 5G network architecture shown in FIG. 2(a). A network element or an entity corresponding to the access network device in FIG. 1(a) or FIG. 1(b) may be a radio access network (RAN) device in the 5G network architecture shown in FIG. 2(a). A network element or an entity corresponding to the session management network element in FIG. 1(a) or FIG. 1(b) may be a session management function (session management function, SMF) network element in the 5G network architecture shown in FIG. 2(a).

The 5G network architecture shown in FIG. 2(a) may include three parts: a terminal device, a data network (DN), and a carrier network. The following briefly describes functions of some of the network elements.

The carrier network may include one or more of the following network elements: an authentication server function (AUSF) network element, a network exposure function (NEF) network element, a policy control function (PCF) network element, unified data management (UDM), a unified data repository (UDR), a network repository function (NRF) network element, an application function (AF) network element, an access and mobility management function (AMF) network element, an SMF network element, a RAN, a UPF network element, and the like. In the foregoing carrier network, a part other than the radio access network may be referred to as a core network.

During implementation, the terminal device in the embodiments may be a device configured to implement a wireless communication function. The terminal device may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehiclemounted device, a wearable device, a virtual reality (VR) terminal device, an augmented reality (AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or a fixed.

The terminal device may establish a connection to the carrier network through an interface (for example, N1) provided by the carrier network, and use services such as a data service and/or a voice service provided by the carrier network. The terminal device may further access a DN through the carrier network and may use a carrier service deployed on the DN and/or a service provided by a third party. The third party may be a service provider other than the carrier network and the terminal device and may provide another services such as a data service and/or a voice service for the terminal device. A representation form of the third party may be determined based on an actual application scenario. This is not limited herein.

The RAN is a subnet of the carrier network and is an implementation system between a service node in the carrier network and the terminal device. To access the carrier network, the terminal device first passes through the RAN, and may be connected to the service node in the carrier network through the RAN. The RAN device may be a device that provides the wireless communication function for the terminal device, and the RAN device is also referred to as an access network device. The RAN device may include but is not limited to: a next generation NodeB (gNB) in 5G, an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a transmission point (TRP), a transmission point (TP), a mobile switching center, and the like.

The AMF network element may perform functions such as mobility management and access authentication/authorization. In addition, the AMF network element is responsible for transferring a user policy between the UE and the PCF.

The SMF network element may perform functions such as session management, execution of a control policy delivered by the PCF, UPF selection, and UE internet protocol (IP) address assignment.

The UPF network element serves as an interface UPF connecting to the data network, and implements functions such as user plane data forwarding, charging statistics based on a session/flow level, and bandwidth throttling.

The UDM network element may be responsible for functions such as subscription data management and user access authorization.

The UDR may be responsible for storage and retrieval of subscription data, policy data, application data, and other types of data.

The NEF network element may be configured to support capability and event exposure.

The AF network element may transfer a requirement of an application side for a network side, for example, a QoS requirement or user equipment status event subscription. The AF may be a third-party functional entity, or may be a carrier-deployed application service, for example, an IP multimedia subsystem (IMS) voice call service. The AF network element may also be referred to as an application server.

The PCF network element may be responsible for policy control functions such as charging for a session level or a service data flow level, QoS bandwidth guarantee, mobility management, and UE policy decision.

The NRF network element may be configured to provide a network element discovery function, and provide, based on a request from another network element, network element information corresponding to a network element type. The NRF further provides a network element management service, for example, registration, update, and deregistration of a network element and subscription and push of a network element status.

The AUSF network element may be responsible for authenticating a user, to determine whether the user or a device is allowed to access a network.

The DN is a network outside the carrier network. The carrier network may access a plurality of DNs. A plurality of services may be deployed in the DN, and the DN may provide services such as a data service and/or a voice service for the terminal device. For example, the DN is a private network of a smart factory, a sensor installed in a workshop of the smart factory may be a terminal device, a control server of the sensor is deployed in the DN, and the control server may serve the sensor. The sensor may communicate with the control server, to obtain instructions of the control server, transmit collected sensor data to the control server based on the instructions, and the like. For another example, the DN is an internal office network of a company, a mobile phone or a computer of an employee of the company may be a terminal device, and the mobile phone or the computer of the employee may access information, data resources, and the like in the internal office network of the company.

Nausf, Nnef, Npcf, Nudm, Naf, Namf, Nsmf, N1, N2, N3, N4, and N6 in FIG. 2(a) are interface serial numbers. For meanings of the interface serial numbers, refer to meanings defined in the 3GPP standard protocol. This is not limited herein.

For example, it is assumed that the communication system shown in FIG. 1(a) or FIG. 1(b) is applied to the 5G network architecture. FIG. 2(b) is a schematic diagram of a 5G network architecture based on a service-based architecture. A network element or an entity corresponding to the user plane network element in FIG. 1(a) may be a UPF network element in the 5G network architecture shown in FIG. 2(b). A network element or an entity corresponding to the access network device in FIG. 1(a) or FIG. 1(b) may be a RAN device in the 5G network architecture shown in FIG. 2(b). A network element or an entity corresponding to the session management network element in FIG. 1(a) or FIG. 1(b) may be an SMF network element in the 5G network architecture shown in FIG. 2(b).

For descriptions of functions of network elements in FIG. 2(b), refer to the descriptions of the functions of the corresponding network elements in FIG. 2(a). Details are not described herein again. A main difference between FIG. 2(b) and FIG. 2(a) lies in that interfaces between the network elements in FIG. 2(b) are point-to-point interfaces rather than service-oriented interfaces.

In the architecture shown in FIG. 2(b), names and functions of the interfaces between the network elements are as follows:

(1) N7 represents an interface between the PCF and the SMF and is configured to deliver a protocol data unit (PDU) session granularity control policy and a service data flow granularity control policy.

(2) N15 represents an interface between the PCF and the AMF and is configured to deliver a UE policy and an access control-related policy.

(3) N5 represents an interface between the AF and the PCF, and is configured to deliver an application service request, and report a network event.

(4) N4 represents an interface between the SMF and the UPF and is configured to transfer information between a control plane and a user plane, including delivery of a forwarding rule, a QoS control rule, a traffic statistics rule, and the like from the control plane to the user plane, and reporting of user plane information.

(5) N11 represents an interface between the SMF and the AMF and is configured to: transfer PDU session tunnel information between the RAN and the UPF, transfer a control message to be sent to UE, transfer radio resource control information to be sent to the RAN, and the like.

(6) N2 represents an interface between the AMF and the RAN and is configured to transfer radio bearer control information from a core network side to the RAN, and the like.

(7) N1 represents an interface between the AMF and the UE, is access-irrelevant, and is configured to transfer a QoS control rule to the UE, and the like.

(8) N8 represents an interface between the AMF and the UDM, and is used by the AMF to obtain, from the UDM, subscription data and authentication data that are related to access and mobility management and used by the AMF to register current mobility management related information of the UE with the UDM.

(9) N10 represents an interface between the SMF and the UDM, and is used by the SMF to obtain, from the UDM, subscription data related to session management, and used by the SMF to register current session related information of the UE with the UDM.

(10) N35 represents an interface between the UDM and the UDR and is used by the UDM to obtain user subscription data information from the UDR.

(11) N36 represents an interface between the PCF and the UDR and is used by the PCF to obtain policy related subscription data and application data related information from the UDR.

(12) N12 represents an interface between the AMF and the AUSF and is used by the AMF to initiate an authentication procedure to the AUSF, where an SUCI may be carried as a subscription identifier.

(13) N13 represents an interface between the UDM and the AUSF and is used by the AUSF to obtain a user authentication vector from the UDM, to perform the authentication procedure.

It may be understood that the network elements or the functions may be network elements in a hardware device, software functions running on dedicated hardware, or virtualized functions instantiated on a platform (for example, a cloud platform). Optionally, the foregoing network elements or functions may be implemented by one device or may be jointly implemented by a plurality of devices or may be one functional module in one device. This is not limited in embodiments.

A session management network element, a policy control network element, a user plane network element, and an access network device may be respectively the SMF, the PCF, the UPF, and the RAN in FIG. 2(a) or FIG. 2(b), or may be network elements that have the functions of the SMF, the PCF, the UPF, and the RAN in future communication, for example, a 6G network. This is not limited. For ease of description, an example in which the session management network element, the policy control network element, the user plane network element, and the access network device are respectively the SMF, the PCF, the UPF, and RAN is used for description. In addition, an example in which the terminal device is UE is used for description.

In an existing QoS model, when receiving a downlink data packet, the UPF encapsulates data packets having a same reliability requirement into a same QoS flow via a filter in a packet detection rule (PDR) preconfigured by the SMF. A plurality of QoS flows may exist in a same PDU session, but each QoS flow has an independent and unique QoS flow identifier (QFI), and each QoS flow is associated with one QoS profile. A network side uses, based on parameters in the QoS profile, same QoS guarantee, such as a delay, a forwarding priority, and a packet loss rate, for data packets belonging to a same QoS flow.

When receiving a downlink QoS flow from the UPF, the RAN encapsulates a plurality of QoS flows into a same data radio bearer (DRB) according to a mapping rule. The same DRB has same reliability guarantee at an air interface side.

As described in the background, currently, a fixed QCI is used for a single service data flow, and each QCI corresponds to a QoS guarantee level. In this manner of using the fixed QCI, transmission performance of a service data flow is low. In an example, in an application scenario of an industrial communication service, when an industrial system is in different states, QoS requirements of the industrial system are different in a control time period. However, in an existing network, a QoS value of the service data flow is adjusted in non-real time. In other words, a same QoS is used in different industrial states. As a result, the QoS does not match an actual requirement. For example, an industrial control application has a high QoS requirement in an initial phase and has a low QoS requirement in a stable phase. If a same QoS is used in the stable phase and the initial phase, radio resources are wasted. In another example, in media service scenarios such as video communication and a multiparty video conference, a QoS requirement of a media service data flow in a determined time period changes. For example, different picture frames have different QoS requirements in a period corresponding to a group of pictures (GOP). For example, when the GOP is 60, a frame rate is 60 frames per second, and a GOP period is one second, an initial frame in one period is an I frame, and a QoS requirement of the I frame is: a rate of 40 megabytes per second and a transmission time length of 16.7 milliseconds. A remaining frame is a P frame, and a QoS requirement of the P frame is: a rate of 10 megabytes per second and a transmission time length from the $16.8^{th}$ millisecond to the first second.

It may be understood that in the foregoing two application scenarios, there are at least two QoS requirements in one time period. Currently, only one fixed QCI can be provided in one time period. In other words, only one QoS requirement can be provided. This may not meet requirements of the foregoing application scenarios.

In the embodiments, the foregoing problem of low transmission performance of a service data flow caused by an imperfect QoS guarantee mechanism for the single service data flow is resolved.

In the embodiments, for a service data flow having the foregoing traffic characteristics, a sending rate (namely, a bit rate) of the service data flow being high in a time period, and a sending rate of the service data flow being low in some other time periods, a corresponding sending manner of the service data flow may be configured. A time period may be divided into different time segments (which may also be referred to as time slices). Data sending rates of different time segments in the time period are configured based on the traffic characteristics of the service data flow. Therefore, when data with a high sending rate is received, a high sending rate is used for sending, and when data with a low sending rate is received, a low sending rate is used for sending.

In the embodiments, the service data flow is a data flow of a service from a third-party application server, for example, a media service data flow. For example, the service data flow includes a video service data flow and a voice service data flow. A network element of a core network, for example, the UPF, may map the service data flow to a QoS flow.

Service data flow information includes one or more of an application identifier (App ID), identification information of a service data flow, characteristic information (Traffic model) of the service data flow, and a QoS requirement of the service data flow.

The application identifier identifies a service, for example, may be a specified character.

The identification information of the service data flow includes, but is not limited to, one or more of the following information: an IP triplet and a uniform resource locator (URL). The IP triplet refers to an IP address, a port number, and a protocol number of an application server (namely, an AF).

The characteristic information of the service data flow indicates traffic characteristic information corresponding to different time slices of the service data flow in a time period, and the characteristic information of the service data flow includes a time period, at least two time slices corresponding to the time period, and a bit rate corresponding to each time slice.

The QoS requirement of the service data flow includes, but is not limited to, one or more of the following information: a bit rate, a packet loss rate (PER), and a packet delay budget (PDB).

It should be noted that, there is a correspondence between the characteristic information of the service data flow and the QoS requirement of the service data flow. Each time slice in one time period in the characteristic information of the service data flow corresponds to one QoS requirement, and different time slices may correspond to a same QoS requirement or different QoS requirements. For example, a time period is divided into 10 time slices, from a time slice 1 to a time slice 10. The time slice 1 corresponds to a QoS requirement 1, time slices 2 and 3 correspond to a QoS requirement 2, and time slices 4 to 10 correspond to a QoS requirement 3.

Figure 3A:
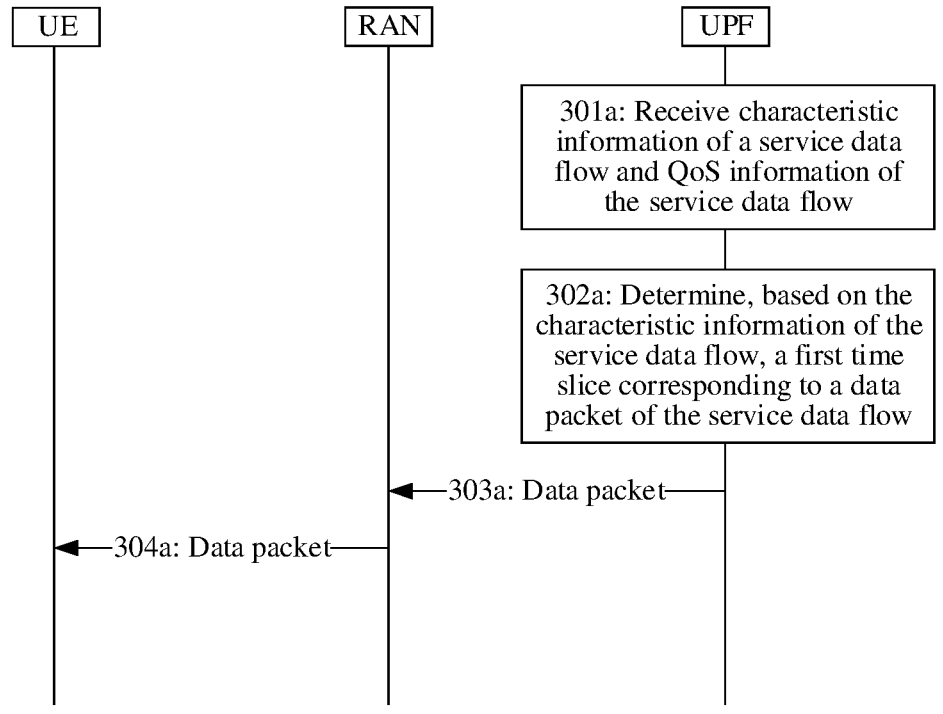
FIG. 3(a) is a schematic diagram of a service data flow transmission method according to an embodiment.

FIG. 3(*a*) is a schematic diagram of a service data flow transmission method according to an embodiment. In the method, a UPF determines different QCIs corresponding to different data packets, and adds the corresponding QCIs to the data packets, so that a RAN can send the data packets based on the QCIs in the data packets.

The method includes the following steps.

Step 301*a*: The UPF receives characteristic information of a service data flow and QoS information of the service data flow.

The characteristic information of the service data flow indicates traffic characteristic information corresponding to different time slices of the service data flow in a time period, and the QoS information indicates QCIs corresponding to the different time slices.

The traffic characteristic information herein may include information such as a bit rate or a data volume of the service data flow or may be other information that can reflect traffic of the service data flow. This is not limited herein.

Optionally, the characteristic information of the service data flow is from an AF. Alternatively, the characteristic information of the service data flow is from a database, and the characteristic information of the service data flow in the database is from an AF. Alternatively, the characteristic information of the service data flow is from an SMF, and the characteristic information of the service data flow in the SMF is from an AF.

Step 302*a*: The UPF determines, based on the characteristic information of the service data flow, a first time slice corresponding to a data packet of the service data flow.

For example, the characteristic information of the service data flow includes a time period, at least two time slices corresponding to the time period, and bit rates corresponding to the at least two time slices, the QoS information includes a QoS flow identifier (QFI) and QCIs corresponding to the at least two time slices, the QCIs corresponding to the at least two time slices are not completely the same, and there is a mapping relationship between the service data flow and a QoS flow corresponding to the QFI. In this case, step 302*a* may be as follows: The UPF determines, based on the characteristic information of the service data flow and a first bit rate of the data packet of the service data flow, the first time slice that is in the at least two time slices and that corresponds to the first bit rate. During application, the UPF first determines, based on the characteristic information of the service data flow, a boundary of a time period of the data packet (that is, a start point of the time period), and then determines, based on at least two time slices corresponding to the time period, bit rates corresponding to the at least two time slices, and the first bit rate of the data packet of the service data flow, the first time slice corresponding to the first bit rate. In other words, the UPF first identifies that a bit rate of the received data packet is the first bit rate, and then determines that a time slice corresponding to the first bit rate is the first time slice. Therefore, the UPF determines that the data packet corresponds to the first time slice.

Figure 4:
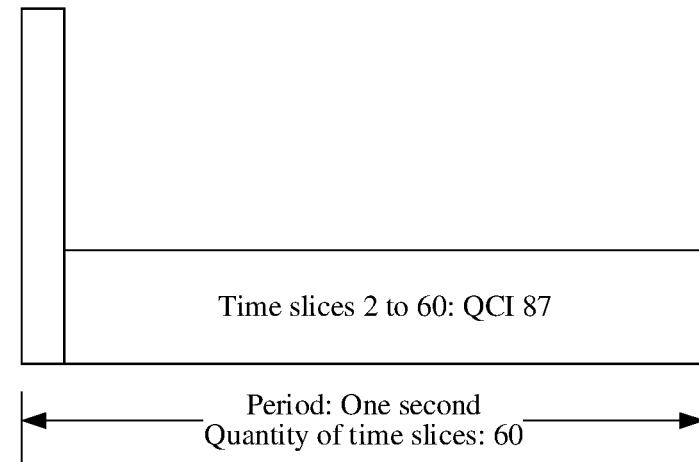
FIG. 4 is a schematic diagram of time slices according to an embodiment.

In an example, FIG. 4 is a schematic diagram of time slices. The characteristic information of the service data flow includes: A time period is one second, the time period is divided into 60 time slices, a time slice 1 corresponds to a bit rate 1, and a time slice 2 to a time slice 60 correspond to a bit rate 2. The QoS information includes the QFI. The time slice 1 corresponds to a QCI 83, and the time slice 2 to time slice 60 correspond to a QCI 87. When receiving the data packet of the service data flow, for example, identifying that the bit rate of the data packet is the bit rate 1, the UPF determines that the data packet corresponds to the time slice 1. Herein, any one of the time slice 1 to the time slice 60 may be considered as the first time slice.

In an implementation method, when the first time slice is the time slice 1, the UPF may determine the time slice 1 according to the following method: The UPF first determines, based on the characteristic information of the service data flow, the boundary of the time period of the received data packet (that is, the start point of the time period, namely, a start point of the time slice 1), and then determines, based on the time slice 1 to the time slice 60 corresponding to the time period, the bit rates corresponding to the time slice 1 to the time slice 60, and the bit rate 1 of the data packet, the time slice 1 corresponding to the bit rate 1. That is, the UPF first determines the boundary of the time period, and then determines, based on the bit rate 1 of the data packet, the time slice 1 that is in one time period starting from the boundary of the time period and that corresponds to the bit rate. In an implementation method, when the first time slice is any one of the time slice 2 to the time slice 60, the UPF may determine any one of the time slice 2 to the time slice 60 according to the following method: The UPF determines, based on the boundary of the time period (that is, a start point of the time slice 1), the bit rates corresponding to the time slice 1 to the time slice 60, and the bit rate 2 of the data packet, a time slice that is in the time slice 2 to the time slice 60 and that corresponds to the bit rate 2. That is, the UPF first determines a start point of the time slice 2 based on the start point of the time slice 1, and then determines one of the time slice 2 to the time slice 60 based on the bit rate 2 of the received data packet. Determining time slice 2 to the time slice 60 may be with reference to a delay between a time point at which the data packet with the bit rate 2 is received and a time point at which the data packet with the bit rate 1 is received.

It should be noted that, in the example shown in FIG. 4, the time period may alternatively be divided into a plurality of time slices with different time lengths. For example, the time period is one second, and the one second is divided into two time slices. A time slice 1 occupies the $0^{th}$ to the $16.7^{th}$ milliseconds, the time slice 1 corresponds to a bit rate 1, and the time slice 1 corresponds to a QCI 83. A time slice 2 occupies the $16.8^{th}$ millisecond to the first second, the time slice 2 corresponds to a bit rate 2, and the time slice 1 corresponds to a QCI 87. When receiving the data packet of the service data flow, for example, identifying that the bit rate of the data packet is the bit rate 1, the UPF determines that the data packet corresponds to the time slice 1. If identifying that the bit rate of the data packet is not the bit rate 1, the UPF determines that the data packet corresponds to the time slice 2. Herein, the time slice 1 or the time slice 2 may be considered as the first time slice.

FIG. 4 uses an example in which there are two QCIs in one period. In practice, one period is not limited to having two QCIs, or there are more than two QCIs in one period.

Step 303a: The UPF sends the data packet to the RAN based on the first time slice corresponding to the data packet of the service data flow and a QCI corresponding to the first time slice. Correspondingly, the RAN receives the data packet.

Herein, the UPF sending the data packet to the RAN may be, for example, that the UPF may send the data packet to the RAN through an interface between the UPF and the RAN or the UPF may send the data packet to the RAN through an intermediate node.

For example, step 303a may be as follows: The RAN includes the identifier (namely, the QFI) of the service data flow and the first QCI corresponding to the first time slice in the data packet and sends the data packet to the RAN. The first QCI is the QCI corresponding to the first time slice in the QCIs corresponding to the at least two time slices in the time period. Optionally, the UPF may add the first QCI and the QFI to the data packet. For example, the first QCI and the QFI may be added to a header of the data packet. An implementation is not limited to such an addition manner. FIG. 4 is used as an example. If determining that the data packet corresponds to the time slice 1, the UPF includes the QFI and the QCI 83 in the data packet. If determining that the data packet corresponds to any one of the time slice 2 to the time slice 60, the UPF includes the QFI and the QCI 87 in the data packet.

Step 304a: The RAN sends the data packet to UE based on a configuration parameter corresponding to the first QCI.

After receiving a data packet that carries the first QCI, the RAN obtains the first QCI from the data packet and sends the data packet to the UE based on the configuration parameter corresponding to the first QCI. The configuration parameter includes one or more of the following: a sending rate, a packet loss rate, a packet delay budget, and a priority. the RAN determines, based on one or more of the information that is indicated by the configuration parameter and that is of the sending rate, the packet loss rate, the packet delay budget, and the priority, a sending manner of sending the data packet to the UE, and sends the data packet to the UE based on the sending manner.

For example, the data packet carries the QCI 83. In this case, the RAN sends the data packet to the UE based on a bit rate, a packet loss rate, a packet delay budget, a priority, or the like corresponding to the QCI 83. For another example, the data packet carries the QCI 87. In this case, the RAN sends the data packet to the UE based on a bit rate, a packet loss rate, a packet delay budget, a priority, or the like corresponding to the QCI 87.

Optionally, the RAN may receive the QoS information of the service data flow from the SMF. The QoS information includes the QFI, the QCI, and the configuration parameter corresponding to the QCI. The RAN may obtain, from the QoS information, configuration parameters corresponding to different QCIs.

Based on the foregoing solution, a plurality of QCIs may be configured for a single service data flow, and corresponding QoS guarantee is performed on data packets in different time slices based on the corresponding QCIs. This implements flexibility of service data flow control and meets QoS control requirements of the single service data flow in different time periods. Therefore, transmission performance of the service data flow can be improved.

Figure 3B:
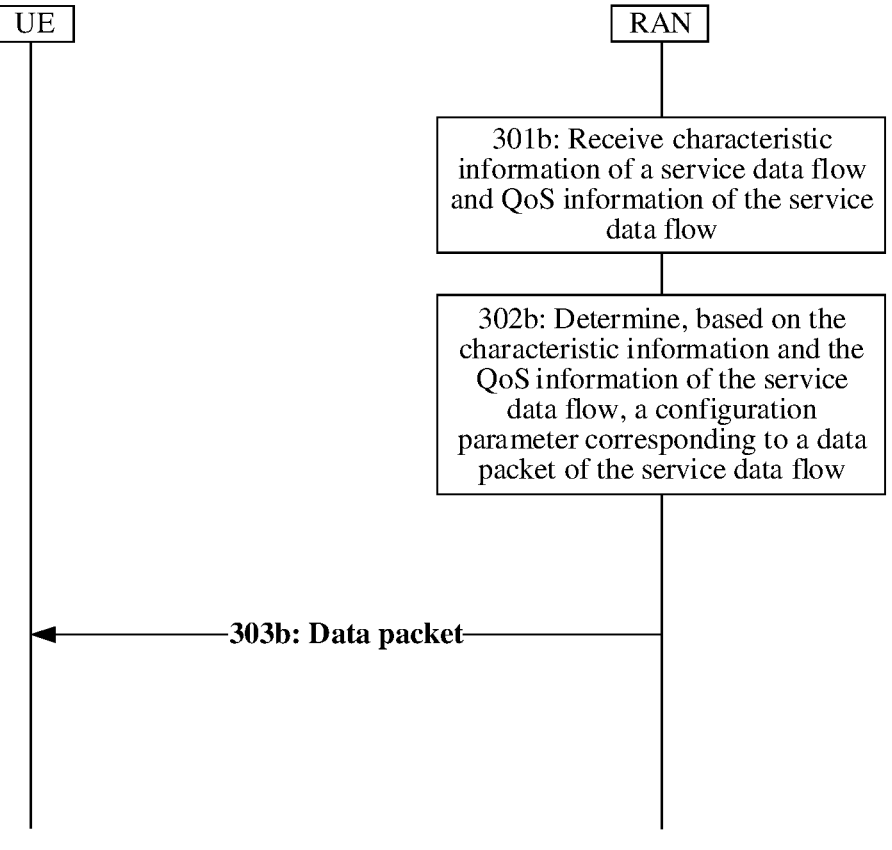
FIG. 3(b) is a schematic diagram of another service data flow transmission method according to an embodiment.

FIG. 3(b) is a schematic diagram of another service data flow transmission method according to an embodiment. In the method, a RAN receives data packets of different sending bit rates of a same service data flow, and therefore the RAN can identify the data packets with different bit rates and perform QoS control by using corresponding QCIs.

The method includes the following steps.

Step 301b: The RAN receives characteristic information of a service data flow and QoS information of the service data flow.

The characteristic information of the service data flow indicates traffic characteristic information corresponding to different time slices of the service data flow in a time period, and the QoS information indicates QCIs corresponding to the different time slices.

Optionally, the characteristic information of the service data flow is from an AF. Alternatively, the characteristic information of the service data flow is from a database, and the characteristic information of the service data flow in the database is from an AF. Alternatively, the characteristic information of the service data flow is from an SMF, and the characteristic information of the service data flow in the SMF is from an AF.

Step 302b: The RAN determines, based on the characteristic information and the QoS information of the service data flow, a configuration parameter corresponding to a data packet of the service data flow.

For content included in the configuration parameter, refer to the foregoing descriptions.

For example, the characteristic information of the service data flow includes a time period, at least two time slices corresponding to the time period, and bit rates corresponding to the at least two time slices, the QoS information includes a QFI and QCIs corresponding to the at least two time slices, the QCIs corresponding to the at least two time slices are not completely the same, and there is a mapping relationship between the service data flow and a QoS flow corresponding to the QFI. In this case, step 302*b* may be as follows: The RAN determines, based on the characteristic information of the service data flow and a first bit rate of the data packet of the service data flow, a first time slice that is in the at least two time slices and that corresponds to the first bit rate. Then, the RAN determines a first QCI corresponding to the first time slice in the QCIs corresponding to the at least two time slices. Further, the RAN determines that a configuration parameter corresponding to the first QCI is the configuration parameter corresponding to the data packet of the service data flow.

FIG. 4 is used as an example. The characteristic information of the service data flow includes: A time period is one second, the time period is divided into 60 time slices, a time slice 1 corresponds to a bit rate 1, and a time slice 2 to a time slice 60 correspond to a bit rate 2. The QoS information includes the QFI. The time slice 1 corresponds to a QCI 83, and the time slice 2 to the time slice 60 correspond to a QCI 87. When receiving the data packet of the service data flow, for example, identifying that a bit rate of the data packet is the bit rate 1, the RAN determines that the data packet corresponds to the time slice 1, further determines that a QCI corresponding to the time slice 1 is the QCI 83, and then determines that a configuration parameter corresponding to the QCI 83 is the configuration parameter corresponding to the data packet of the service data flow.

Step 303*b*: The RAN sends the data packet to UE based on the configuration parameter.

For example, the RAN determines that the data packet corresponds to the QCI 83. In this case, the RAN sends the data packet to the UE based on a bit rate, a packet loss rate, a packet delay budget, a priority, or the like corresponding to the QCI 83. For another example, the RAN determines that the data packet corresponds to the QCI 87. In this case, the RAN sends the data packet to the UE based on a bit rate, a packet loss rate, a packet delay budget, a priority, or the like corresponding to the QCI 87.

Based on the foregoing solution, a plurality of QCIs may be configured for a single service data flow, and corresponding QoS guarantee is performed on data packets in different time slices based on the corresponding QCIs. This may implement flexibility of service data flow control and may meet QoS control requirements of the single service data flow in different time periods. Therefore, transmission performance of the service data flow can be improved.

In an implementation method, in the embodiment corresponding to FIG. 3(*a*) or FIG. 3(*b*), before sending the data packet to the UE, the RAN first receives channel state information (CSI) from the UE, and then determines, based on the CSI, a sending occasion and a subcarrier that are occupied for sending the data packet. Further, the RAN sends, based on the determined configuration parameter corresponding to the first QCI, the data packet to the terminal device at the sending occasion occupied by the data packet and on the subcarrier occupied by the data packet.

A method for receiving the CSI by the RAN from the UE includes, but is not limited to, the following method 1 to method 3.

Method 1: The RAN sends configuration information to the UE, where the configuration information includes indication information and the time period, and the indication information indicates that a period of reporting the CSI by the UE is the same as the time period; and the RAN receives the CSI from the UE.

In other words, the RAN indicates the UE to periodically report the CSI to the RAN, and the period of reporting the CSI is equal to the time period of sending the CSI to the UE.

Method 2: The RAN sends configuration information to the UE, where the configuration information includes indication information and the time period, and the indication information indicates that a period of reporting the CSI by the UE is the same as the time period, and indicates the UE to report the CSI in first duration before a moment at which the data packet arrives; and the RAN receives the CSI from the UE.

In other words, the RAN indicates the UE to periodically report the CSI to the RAN, and the period of reporting the CSI is equal to the time period. In addition, each time the UE reports the CSI, the UE reports the CSI by first duration earlier than the moment at which the data packet is received from the RAN. Therefore, the RAN can determine, based on the received CSI, the sending occasion and the subcarrier that are occupied by the data packet to be sent subsequently.

Method 3: The RAN determines arrival time of the data packet based on the time period; the RAN sends downlink control information (DCI) to the UE in second duration before a moment at which the data packet arrives, to indicate the UE to report the CSI; and the RAN receives the CSI from the UE.

In other words, the RAN sends the DCI to the UE at a moment at which the second duration before the moment at which the data packet is received from the UPF is located, to indicate the UE to report the CSI. Therefore, the RAN can determine, based on the received CSI, the sending occasion and the subcarrier that are occupied by the data packet to be sent subsequently.

Figure 5:
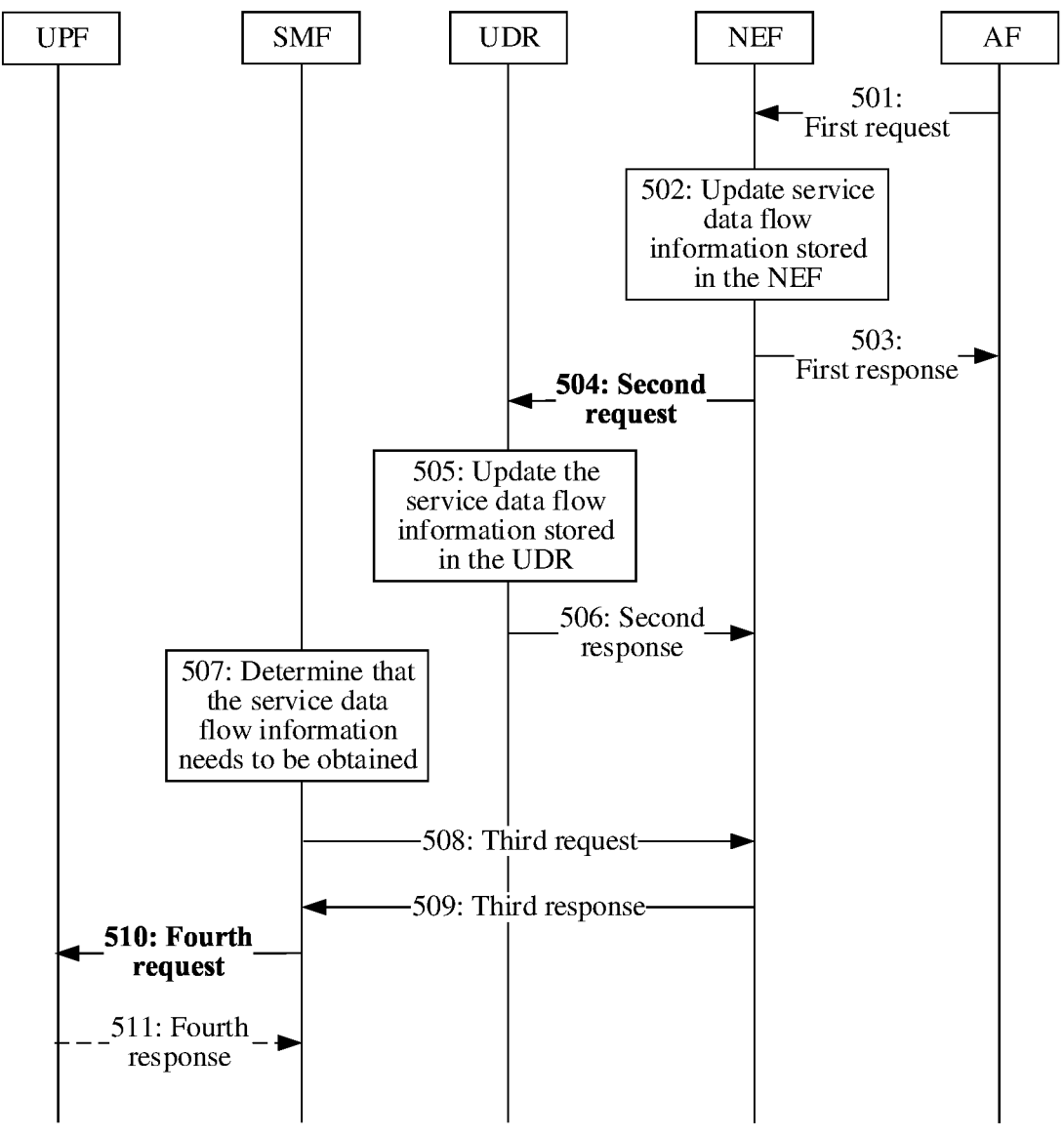
FIG. 5 is a schematic diagram of another service data flow transmission method according to an embodiment.
Figures 6, 7:
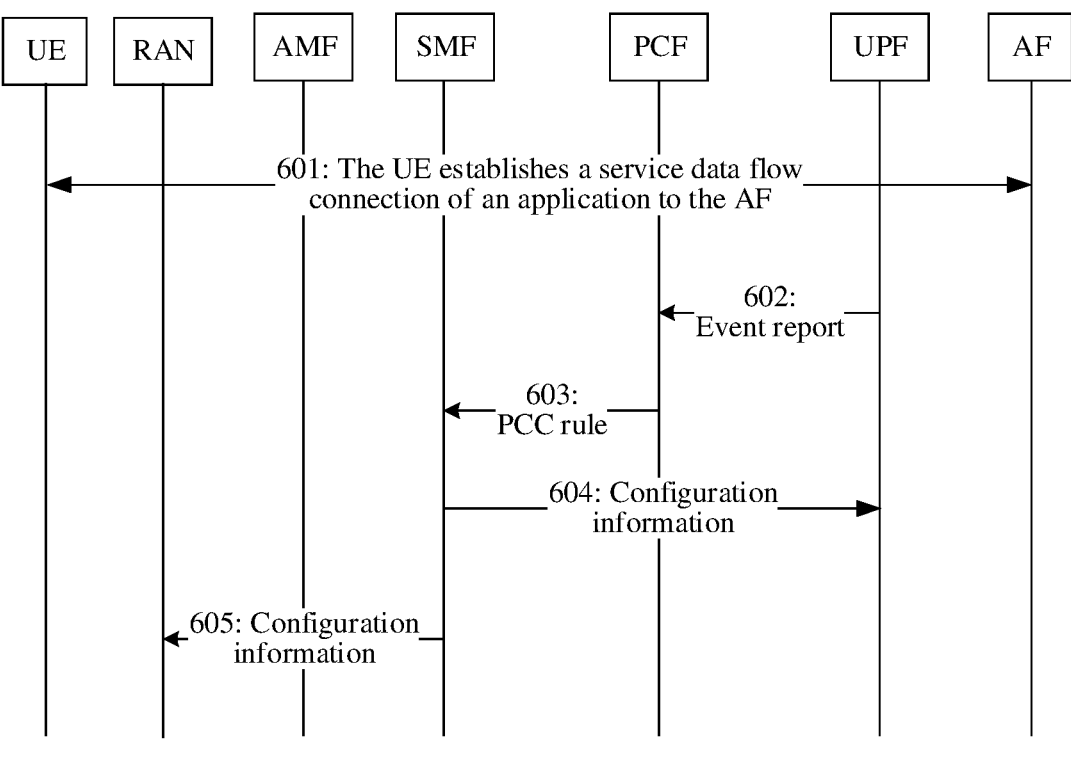
FIG. 6 is a schematic diagram of another service data flow transmission method according to an embodiment.
FIG. 7 is a schematic diagram of a communication apparatus according to an embodiment.

In an example, the following describes embodiments shown in FIG. 3(*a*) and FIG. 3(*b*) with reference to the embodiments shown in FIG. 5 and FIG. 6.

FIG. 5 is a schematic diagram of another service data flow transmission method according to an embodiment. The method provides a process of configuring service data flow information. An AF may provide the service data flow information for a network via an NEF. The service data flow information includes at least one of an application identifier, identification information of a service data flow, characteristic information of the service data flow, or a QoS requirement of the service data flow. For details, refer to the foregoing descriptions.

The method includes the following steps.

Step 501: The AF sends a first request to the NEF. Correspondingly, the NEF may receive the first request.

The first request carries newly added service data flow information or updated service data flow information.

In an implementation method, when preparing to add the new service data flow information, the AF sends the first request to the NEF. The first request may be a service data flow create request, for example, may be a PFDManagement_Create Request. The service data flow create request carries the newly added service data flow information.

In another implementation method, when preparing to update the existing service data flow information, the AF sends the first request to the NEF. The first request may be a service data flow update request, for example, may be a PFDManagement_Update Request. The service data flow update request carries the updated service data flow information.

Step 502: The NEF updates the service data flow information stored in the NEF.

For example, the NEF first determines whether the first request is allowed, and if the first request is allowed, the NEF updates the service data flow information stored in the NEF. For example, if the first request carries the newly added service data flow information, the NEF updates, based on the newly added service data flow information, the service data flow information stored in the NEF. For another example, if the first request carries the updated service data flow information, the NEF updates, based on the updated service data flow information, the service data flow information stored in the NEF.

Step 503: The NEF sends a first response to the AR Correspondingly, the AF may receive the first response.

The first response notifies the AF that the request is successfully processed.

If the NEF determines that the first request is not allowed or the NEF fails to update the service data flow information in step 502, the first response notifies the AF that the request fails to be processed.

The first response may be a service data flow create response or a service data flow update response.

Step 504: The NEF sends a second request to a UDR. Correspondingly, the UDR may receive the second request.

The second request carries the newly added service data flow information or the updated service data flow information.

In an implementation method, when preparing to add the new service data flow information, the NEF sends the second request to the UDR. The second request may be a data management create request (DM_Create Request), and the data management create request carries the newly added service data flow information.

In another implementation method, when preparing to update the existing service data flow information, the NEF sends the second request to the UDR. The second request may be a data management update request (DM_Update Request), and the data management update request carries the updated service data flow information.

Step 505: The UDR updates the service data flow information stored in the UDR.

For example, if the second request carries the newly added service data flow information, the UDR updates, based on the newly added service data flow information, the service data flow information stored in the UDR. For another example, if the second request carries the updated service data flow information, the UDR updates, based on the updated service data flow information, the service data flow information stored in the UDR.

Step 506: The UDR sends a second response to the NEF. Correspondingly, the NEF may receive the second response.

The second response notifies the NEF that the request is successfully processed.

If the UDR fails to update the service data flow information in step 505, the second response notifies the NEF that the request fails to be processed.

The second response may be a data management create response (DM_Create Response) or a data management update response (DM_Update Response).

Step 507: An SMF determines that the service data flow information needs to be obtained.

For example, a timer is set on the SMF, and each time specified duration expires, the SMF is triggered to obtain service data flow information.

An SMF may determine that the service data flow information needs to be obtained by determining that the newly added service data flow information needs to be obtained or by determining that the updated service data flow information needs to be obtained.

Step 508: The SMF sends a third request to the NEF. Correspondingly, the NEF may receive the third request.

The third request requests to obtain the service data flow information.

For example, the third request may be a PFDManagement_Fetch Request.

Step 509: The NEF sends a third response to the SMF. Correspondingly, the SMF may receive the third response.

The third response carries the newly added service data flow information or the updated service data flow information.

For example, the third response may be a PFDManagement_Fetch Response.

After receiving the newly added service data flow information or the updated service data flow information, the SMF stores the newly added service data flow information or the updated service data flow information in the SMF.

In step 507 to step 509, the SMF actively requests to obtain the service data flow information from the NEF. In another implementation method, alternatively, after receiving the newly added service data flow information or the updated service data flow information, the NEF actively reports the newly added service data flow information or the updated service data flow information to the SMF. Alternatively, in another implementation method, the SMF may actively request to obtain the service data flow information from the UDR.

Step 510: The SMF sends a fourth request to a UPF. Correspondingly, the UPF may receive the fourth request.

The fourth request carries identification information of the newly added service data flow or identification information of the updated service data flow.

For example, the fourth request may be a PFD Management Request.

The UPF may perform data flow detection based on the identification information of the newly added service data flow or the identification information of the updated service data flow, to identify a new service data flow.

Step 511: The UPF sends a fourth response to the SME Correspondingly, the SMF may receive the fourth response.

This step is optional.

In the foregoing embodiment, the AF provides the newly added service data flow information or the updated service data flow information and updates the newly added service data flow information or the updated service data flow information to the NEF, the UDR, and the SMF in the network. In an implementation, the update may be performed only on one or more of the NEF, the UDR, and the SMF in the network, or may be performed on another network element in the network, for example, an AMF or a PCF. In addition, the identification information that is of the service data flow and that is in the service data flow information is further updated to the UPF, so that the UPF may start to detect a new service data flow.

Based on the foregoing embodiment, the network may obtain and configure specified service data flow information, so that a corresponding service data flow can be detected, and data flow transmission may be subsequently performed based on the service data flow information. However, in a conventional technology, the characteristic information of the service data flow in the service data flow information cannot be provided for the network.

FIG. 6 is a schematic diagram of another service data flow transmission method according to an embodiment. The method provides a process of configuring characteristic information of a service data flow.

The method includes the following steps.

Step 601: UE establishes a service data flow connection of an application to an AF.

The UE establishes the service data flow connection of the application to the AR For example, an application in the UE may establish a service data flow connection of an application layer to an application in the AF.

An IP triplet or a URL of a service data flow keeps consistent with an IP triplet or a URL in service data flow information provided by the AF for a network in advance. For example, the AF provides the service data flow information for the network according to the method in the embodiment in FIG. 5. In this case, the IP triplet or the URL of the service data flow in step 601 keeps consistent with the IP triplet or the URL in the service data flow information in the embodiment in FIG. 5.

Step 602: A UPF performs packet detection according to a configured packet detection rule. When detecting a service data flow corresponding to a specified service, the UPF sends an event report to a PCF. The event report carries a detected packet data flow description (PFD) identifier.

For example, if service data flow information corresponding to a service is preconfigured on the UPF (for example, configured through step 510 in the embodiment in FIG. 5), the UPF may use an IP triplet or a URL in the service data flow information as a parameter of the packet detection rule, to perform packet detection.

In another implementation method, the UPF may alternatively send an event report to an SMF, and then the SMF sends the event report to the PCF.

Step 603: The PCF sends a policy and charging control (PCC) rule to the SMF. Correspondingly, the SMF may receive the PCC rule.

The PCF may first obtain the service data flow information from a network element such as a UDR or the SMF, and then generate the PCC rule based on the service data flow information. When the service is transmitted by using a plurality of data flows, the PCF generates one PCC rule for each service data flow, and then the PCF sends the PCC rule to the SMF. Each PCC rule includes an application identifier, identification information of the service data flow, characteristic information of the service data flow, and QoS information of the service data flow. The QoS information of the service data flow is obtained based on a QoS requirement of the service data flow. The QoS information of the service data flow includes a QoS flow identifier (QFI) and a QCI corresponding to each time slice in a time period in the characteristic information of the service data flow. Optionally, the QoS information of the service data flow further includes a configuration parameter corresponding to each QCI, and the configuration parameter includes one or more of a sending rate, a packet loss rate, a packet delay budget, and a priority. For example, when the QCI is defined in a standard, the QoS information of the service data flow may not need to carry the configuration parameter corresponding to the QCI. When the QCI is customized, the QoS information of the service data flow may carry the configuration parameter corresponding to the QCI.

In an implementation method, in this step, the PCF may send an SMF initiated SM_Policy Association Modification Request to the SMF, where the SMF initiated SM_Policy Association Modification Request carries the PCC rule.

Step 604: The SMF sends configuration information of at least one service data flow to the UPF. Correspondingly, the UPF may receive the configuration information of the at least one service data flow.

Each service data flow corresponds to one piece of configuration information, and the configuration information includes an application identifier, identification information of the service data flow, characteristic information of the service data flow, and QoS information of the service data flow.

The SMF may send configuration information of a plurality of service data flows to the UPF by using an N4 message (for example, an N4 PDU Establishment Modification Request or an N4 PDU Session Modification Request).

For an implementation method in which the UPF identifies the service data flow or performs control on the service data flow based on the characteristic information of the service data flow, refer to the related descriptions in the embodiment in FIG. 3. Details are not described herein again.

Step 605: The SMF sends the configuration information of the at least one service data flow to a RAN via an AMF. Correspondingly, the RAN may receive the configuration information of the at least one service data flow.

Each service data flow corresponds to one piece of configuration information, and the configuration information includes the application identifier, the identification information of the service data flow, the characteristic information of the service data flow, and the QoS information of the service data flow.

For an implementation method in which the RAN identifies or sends the service data flow based on the characteristic information of the service data flow, refer to the related descriptions in the embodiment in FIG. 3. Details are not described herein again.

Based on the foregoing embodiment, after the application in the UE establishes the service data flow connection of the application to the AF, the configuration information of the service data flow may be sent to the RAN and the UPF, and the RAN and the UPF perform scheduling and transmission control on the service data flow based on the configuration information, so that transmission efficiency of the service data flow can be improved.

The foregoing describes the solutions from a perspective of interaction between the network elements. It may be understood that, to implement the foregoing functions, each network element includes a corresponding hardware structure and/or software module for executing each function. A person of ordinary skill in the art should easily be aware that, in combination with the units and algorithm steps in the examples described in the embodiments, the embodiments may be implemented by hardware or a combination of hardware and computer software. Whether a function is performed by hardware or hardware driven by computer software depends on particular applications and constraints of the solutions. A person skilled in the art may use different methods to implement the described functions for each particular application, but it should not be considered that the implementation goes beyond the scope of the embodiments.

It may be understood that, in the foregoing method embodiments, steps or operations that are correspondingly implemented by a first policy control network element may alternatively be implemented by a component (for example, a chip or a circuit) configured in the first policy control network element, steps or operations that are correspondingly implemented by a second policy control network element may alternatively be implemented by a component (for example, a chip or a circuit) configured in the second policy control network element, steps or operations that are correspondingly implemented by a binding support network element may alternatively be implemented by a component (for example, a chip or a circuit) configured in the binding support network element, and steps or operations that are correspondingly implemented by the application function network element may alternatively be implemented by a component (for example, a chip or a circuit) configured in the application function network element.

FIG. 7 is a schematic diagram of a communication apparatus according to an embodiment. The apparatus is configured to implement the steps performed by the corresponding user plane network element or the access network device in the foregoing embodiments. As shown in FIG. 7, the apparatus 700 includes a sending unit 710, a receiving unit 720, and a processing unit 730.

In the first embodiment, the communication apparatus is a user plane network element or a chip used in a user plane network element.

In this case, the receiving unit 720 is configured to receive characteristic information of a service data flow and quality of service (QoS) information of the service data flow, where the characteristic information of the service data flow indicates traffic characteristic information corresponding to different time slices of the service data flow in a time period, and the QoS information indicates QoS class identifiers (QCIs) corresponding to the different time slices. The processing unit 730 is configured to determine, based on the characteristic information of the service data flow, a first time slice corresponding to a data packet of the service data flow. The sending unit 710 is configured to send the data packet based on the first time slice corresponding to the data packet of the service data flow and a QCI corresponding to the first time slice.

In a possible implementation method, the characteristic information includes a time period, at least two time slices corresponding to the time period, and bit rates corresponding to the at least two time slices, the QoS information includes a QoS flow identifier (QFI) and QCIs corresponding to the at least two time slices, the QCIs corresponding to the at least two time slices are not completely the same, and there is a mapping relationship between the service data flow and a QoS flow corresponding to the QFI. That the processing unit 730 is configured to determine, based on the characteristic information of the service data flow, a first time slice corresponding to a data packet of the service data flow may include: The processing unit 730 is configured to determine, based on the characteristic information of the service data flow and a first bit rate of the data packet of the service data flow, the first time slice that is in the at least two time slices and that corresponds to the first bit rate.

In a possible implementation method, that the processing unit 730 is configured to determine, based on the characteristic information of the service data flow and a first bit rate of the data packet of the service data flow, the first time slice that is in the at least two time slices and that corresponds to the first bit rate may include: The processing unit 730 is configured to: determine, based on the characteristic information, a boundary of a time period of the data packet; and determine, based on at least two time slices corresponding to the time period, bit rates corresponding to the at least two time slices, and the first bit rate, the first time slice corresponding to the first bit rate.

In a possible implementation method, the processing unit 730 is further configured to add the QFI and the first QCI to the data packet. That the sending unit 710 is configured to send the data packet based on the first time slice corresponding to the data packet of the service data flow and a QCI corresponding to the first time slice may include: The sending unit 710 is configured to send the data packet that carries the QFI and the first QCI, where the first QCI is the QCI corresponding to the first time slice in the QCIs corresponding to the at least two time slices.

In a possible implementation method, that the processing unit 730 is configured to add the QFI and the first QCI to the data packet may include: The processing unit 730 is configured to add the QFI and the first QCI to a header of the data packet.

In a possible implementation method, the characteristic information of the service data flow is from an application server; the characteristic information of the service data flow is from a database, and the characteristic information of the service data flow in the database is from an application server; or the characteristic information of the service data flow is from a session management network element, and the characteristic information of the service data flow in the session management network element is from an application server.

In the second embodiment, the communication apparatus is an access network device or a chip used in an access network device.

In this case, the receiving unit 720 is configured to receive characteristic information of a service data flow and quality of service (QoS) information of the service data flow, where the characteristic information of the service data flow indicates traffic characteristic information corresponding to different time slices of the service data flow in a time period, and the QoS information indicates QoS class identifiers (QCIs) corresponding to the different time slices. The processing unit 730 is configured to determine, based on the characteristic information and the QoS information of the service data flow, a configuration parameter corresponding to a data packet of the service data flow. The sending unit 710 is configured to send the data packet to a terminal device based on the configuration parameter.

In a possible implementation method, the characteristic information includes a time period, at least two time slices corresponding to the time period, and bit rates corresponding to the at least two time slices, the QoS information includes a QFI and QCIs corresponding to the at least two time slices, the QCIs corresponding to the at least two time slices are not completely the same, and there is a mapping relationship between the service data flow and a QoS flow corresponding to the QFI. That the processing unit 730 is configured to determine, based on the characteristic information and the QoS information of the service data flow, a configuration parameter corresponding to a data packet of the service data flow may include: The processing unit 730 is configured to: determine, based on the characteristic information of the service data flow and a first bit rate of the data packet of the service data flow, a first time slice that is in the at least two time slices and that corresponds to the first bit rate; determine a first QCI corresponding to the first time slice in the QCIs corresponding to the at least two time slices; and determine that a configuration parameter corresponding to the first QCI is the configuration parameter corresponding to the data packet of the service data flow.

In a possible implementation method, the configuration parameter includes one or more of the following information: a sending rate, a packet loss rate, a packet delay budget, and a priority.

In a possible implementation method, the processing unit 730 is further configured to determine, based on reported channel state information CSI, a sending occasion and a subcarrier that are occupied for sending the data packet. The sending unit 710 may be configured to send, based on the configuration parameter corresponding to the first QCI, the data packet to the terminal device at the sending occasion occupied by the data packet and on the subcarrier occupied by the data packet.

In a possible implementation method, the sending unit 710 is further configured to send configuration information to the terminal device, where the configuration information includes indication information and the time period, and the indication information indicates that a period of reporting the channel state information CSI by the terminal device is the same as the time period. The receiving unit 720 is further configured to receive the CSI from the terminal device.

In a possible implementation method, the indication information further indicates the terminal device to report the CSI in first duration before a moment at which the data packet arrives.

In a possible implementation method, the processing unit 730 is further configured to determine arrival time of the data packet based on the time period. The sending unit 710 is further configured to send downlink control information DCI to the terminal device in second duration before a moment at which the data packet arrives, where the DCI indicates the terminal device to report the CSI. The receiving unit 720 is further configured to receive the CSI from the terminal device.

In a possible implementation method, the characteristic information of the service data flow is from an application server; the characteristic information of the service data flow is from a database, and the characteristic information of the service data flow in the database is from an application server; or the characteristic information of the service data flow is from a session management network element, and the characteristic information of the service data flow in the session management network element is from an application server.

Optionally, the communication apparatus 700 may further include a storage unit. The storage unit is configured to store data or instructions (which may also be referred to as code or a program). The units may interact with or be coupled to the storage unit, to implement a corresponding method or function. For example, the processing unit 730 may read the data or the instructions in the storage unit, so that the communication apparatus implements the methods in the foregoing embodiments.

It should be understood that division into the units in the apparatus is merely logical function division. During actual implementation, all or some of the units may be integrated into one physical entity or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. During implementation, the steps in the foregoing methods or the foregoing units may be implemented by using a hardware integrated logic circuit in a processor element, or may be implemented in the form of software invoked by the processing element.

In an example, a unit in any one of the foregoing apparatuses may be one or more integrated circuits configured to implement the foregoing methods, for example, one or more application-specific integrated circuits (ASIC), one or more microprocessors (DSPs), one or more field programmable gate arrays (FPGA), or a combination of at least two of the integrated circuit forms. For another example, when the units in the apparatus may be implemented by scheduling a program by a processing element, the processing element may be a general-purpose processor, for example, a central processing unit (CPU) or another processor that can invoke the program. For another example, the units may be integrated and implemented in a form of a system-on-a-chip (SOC).

The sending unit 710 is an interface circuit of the apparatus, and is configured to send a signal to another apparatus. For example, when the apparatus is implemented by using a chip, the sending unit 710 is an interface circuit used by the chip to send a signal to the another chip or apparatus.

The receiving unit 720 is an interface circuit of the apparatus, and is configured to receive a signal from another apparatus. For example, when the apparatus is implemented by using the chip, the receiving unit 720 is an interface circuit used by the chip to receive a signal from another chip or apparatus.

Figure 8:
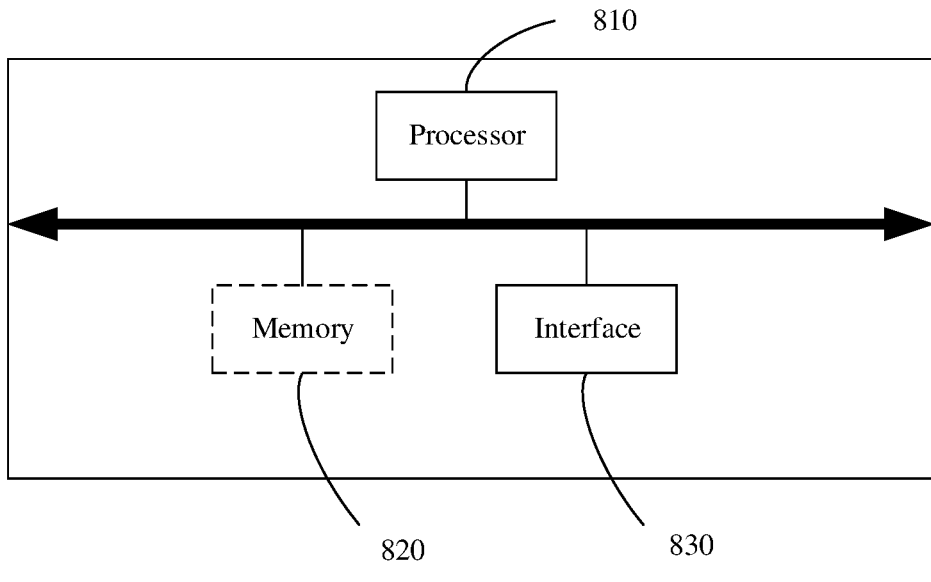
FIG. 8 is a schematic diagram of another communication apparatus according to an embodiment.

FIG. 8 is a schematic diagram of a communication apparatus according to an embodiment. The communication apparatus is configured to implement the operations of the user plane network element or the access network device in the foregoing embodiments. As shown in FIG. 8, the communication apparatus includes a processor 810 and an interface 830. Optionally, the communication apparatus further includes a memory 820. The interface 830 is configured to communicate with another device.

In the foregoing embodiments, the methods performed by the user plane network element or the access network device may be implemented by the processor 810 by invoking a program stored in a memory (which may be the memory 820 in the user plane network element or the access network device, or may be an external memory). In other words, the user plane network element or the access network device may include the processor 810. The processor 810 invokes the program in the memory, to perform the methods performed by the user plane network element or the access network device in the foregoing method embodiments. The processor herein may be an integrated circuit having a signal processing capability, for example, a CPU. The user plane network element or the access network device may be implemented by using one or more integrated circuits configured to implement the foregoing methods, for example, one or more ASICs, one or more microprocessors DSPs, one or more FPGAs, or a combination of at least two of the integrated circuits. Alternatively, the foregoing implementations may be combined.

Functions, implementations, and processes of the sending unit 710, the receiving unit 720, and the processing unit 730 in FIG. 7 may be implemented by the processor 810 in the communication apparatus 800 shown in FIG. 8 by invoking computer-executable instructions stored in the memory 820. Alternatively, a function/an implementation process of the processing unit 730 in FIG. 7 may be implemented by the processor 810 in the communication apparatus 800 shown in FIG. 8 by invoking computer-executable instructions stored in the memory 820, and functions/implementation processes of the sending unit 710 and the receiving unit 720 in FIG. 7 may be implemented through the interface 830 in the communication apparatus 800 shown in FIG. 8.

A person of ordinary skill in the art may understand that various numbers such as "first" and "second" may be used for differentiation for ease of description, and are not used to limit the scope of the embodiments or represent a sequence. The term "and/or" describes an association relationship for describing associated objects and represents that three relationships may exist. For example, A and/or B may represent the following three cases: only A exists, both A and B exist, and only B exists. The character "/" generally indicates an "or" relationship between the associated objects. "At least one" means one or more. "At least two" means two or more. "At least one", "any one", or a similar expression thereof indicates any combination of the items and includes a singular item (piece) or any combination of plural items (pieces). For example, at least one of a, b, or c may indicate: a, b, c, a and b, a and c, b and c, or a, b, and c, where a, b, and c may be singular or plural. The term "a plurality of" means two or more, and another quantifier is similar to this.

It should be understood that sequence numbers of the foregoing processes do not mean execution sequences in the various embodiments. The execution sequences of the processes should be determined based on functions and internal logic of the processes and should not be construed as any limitation on the implementation processes of the embodiments.

It may be understood by a person skilled in the art that, for the purpose of convenient and brief description, for a detailed working process of the foregoing system, apparatus, and unit, refer to a corresponding process in the foregoing method embodiments. Details are not described herein again.

All or some of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedure or functions according to the embodiments are all or partially generated. The computer may be a general-purpose computer, a dedicated computer, a computer network, or other programmable apparatuses. The computer instructions may be stored in a non-transitory computer-readable storage medium The non-transitory computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits in the embodiments may implement or operate the described function by using a general-purpose processor, a digital signal processor, an application-specific integrated circuit (ASIC), a field programmable gate array (FPGA) or another programmable logical apparatus, a discrete gate or transistor logic, a discrete hardware component, or any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments may be directly embedded into hardware, a software unit executed by a processor, or a combination thereof. A software unit may be stored in a random access memory (RAM), a flash memory, a read-only memory (ROM), an EPROM memory, an EEPROM memory, a register, a hard disk, a removable magnetic disk, a CD-ROM, or a non-transitory storage medium of any other form in the art. For example, the non-transitory storage medium may connect to a processor, so that the processor may read information from the storage medium and write information to the storage medium. Alternatively, the non-transitory storage medium may be integrated into a processor. The processor and the non-transitory storage medium may be disposed in the ASIC.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a function in one or more processes in the flowcharts and/or in one or more blocks in the block diagrams.

The functions may be implemented by hardware, software, firmware, or any combination thereof. If the embodiments are implemented by software, these functions may be stored in a non-transitory computer-readable medium. The non-transitory computer-readable medium may be a computer storage medium. The computer storage medium may be an available medium that may be accessed by any general-purpose or special computer. For example, such a non-transitory computer-readable medium may include, but is not limited to, a RAM, a ROM, an EEPROM, a CD-ROM, or another optical disc storage, a disk storage or another magnetic storage apparatus, or any other medium that may be used to bear or store program code, where the program code is in a form of an instruction or a data structure or in a form that can be read by a general-purpose or special computer or a general-purpose or special processor. The disk and the disc include a compact disc, a laser disc, an optical disc, a digital versatile disc (DVD), a floppy disk, and a Blu-ray disc. The disc may copy data magnetically, and the disk may optically copy data with a laser. The foregoing combination may also be included in the non-transitory computer-readable medium.

A person skilled in the art should be aware that in the foregoing one or more examples, functions may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

In the foregoing implementations, the objectives, solutions, and beneficial effects of the embodiments are further described in detail. It should be understood that the foregoing descriptions are merely implementations but are not intended to limit the scope of the embodiments. Any modification, equivalent replacement, improvement, or the like made based on the embodiments shall fall within the scope of the embodiments. According to the foregoing descriptions, technologies in the conventional technology may use or implement the content of the embodiments. The basic principles may be applied to other variations without departing from the essence and scope of the embodiments. Therefore, the content is not limited to the described embodiments but may also be extended to a maximum scope that is consistent with the principles and new characteristics in the embodiments.

Although is the embodiments are described with reference to characteristics and embodiments thereof, it is clear that various modifications and combinations may be made to them without departing from their spirit and scope of A person skilled in the art can make various modifications and variations to this application without departing from the scope of the embodiments.

What is claimed is:

1. A service data flow transmission method, comprising:
receiving, by an access network device, characteristic information of a service data flow and quality of service (QOS) information of the service data flow, wherein the characteristic information of the service data flow indicates traffic characteristic information corresponding to different time slices within the service data flow in a time period, and the QoS information indicates QoS class identifiers (QCIs) corresponding to the different time slices;
determining, by the access network device based on the characteristic information and the QoS information of the service data flow, a configuration parameter corresponding to a data packet of the service data flow; and
sending, by the access network device, the data packet to a terminal device based on the configuration parameter.

2. The service data flow transmission method according to claim 1, wherein the characteristic information comprises a time period, at least two time slices corresponding to the time period, and bit rates corresponding to the at least two time slices, the QoS information comprises a QFI and QCIs corresponding to the at least two time slices, the QCIs corresponding to the at least two time slices are not completely the same, and there is a mapping relationship between the service data flow and a QoS flow corresponding to the QFI; and
the determining step further comprises:
determining, by the access network device based on the characteristic information of the service data flow and a first bit rate of the data packet of the service data flow, a first time slice that is in the at least two time slices and that corresponds to the first bit rate;
determining, by the access network device, a first QCI corresponding to the first time slice in the QCIs corresponding to the at least two time slices; and
determining, by the access network device, that a configuration parameter corresponding to the first QCI is the configuration parameter corresponding to the data packet of the service data flow.

3. The service data flow transmission method according to claim 1, wherein the configuration parameter comprises one or more of the following information: a sending rate, a packet loss rate, a packet delay budget, or a priority.

4. The service data flow transmission method according to claim 2, further comprising:
determining, by the access network device based on reported channel state information CSI, a sending occasion and a subcarrier that are occupied for sending the data packet; and
sending, by the access network device, the data packet to the terminal device based on the configuration parameter further comprises:

sending, by the access network device based on the configuration parameter corresponding to the first QCI, the data packet to the terminal device at the sending occasion occupied by the data packet and on the subcarrier occupied by the data packet.

5. The service data flow transmission method according to claim 4, further comprising:
sending, by the access network device, configuration information to the terminal device, wherein the configuration information comprises indication information and the time period, and the indication information indicates that a period of reporting the channel state information CSI by the terminal device is the same as the time period; and
receiving, by the access network device, the CSI from the terminal device.

6. The service data flow transmission method according to claim 5, wherein the indication information further indicates the terminal device to report the CSI in first duration before a moment at which the data packet arrives.

7. The service data flow transmission method according to claim 4, further comprising:
determining, by the access network device, arrival time of the data packet based on the time period;
sending, by the access network device, downlink control information DCI to the terminal device in second duration before a moment at which the data packet arrives, wherein the DCI indicates the terminal device to report the CSI; and
receiving, by the access network device, the CSI from the terminal device.

8. The service data flow transmission method according to claim 1, wherein
the characteristic information of the service data flow is from an application server;
the characteristic information of the service data flow is from a database, and the characteristic information of the service data flow in the database is from an application server; or
the characteristic information of the service data flow is from a session management network element, and the characteristic information of the service data flow in the session management network element is from an application server.

9. The service data flow transmission method according to claim 1, further comprising:
sending, by the access network device, the characteristic information of the service data flow and the QoS information of the service data flow to the access network device.

10. A communication apparatus comprising:
a processor; and
a non-transitory computer-readable storage medium configured to storestoring a program, comprising instructions that, when to be executed by the processor, the program including instructions for cause the communication apparatus to perform the operations:
receiving characteristic information of a service data flow and quality of service (QOS) information of the service data flow, wherein the characteristic information of the service data flow indicates traffic characteristic information corresponding to different time slices within the service data flow in a time period, and the QoS information indicates QoS class identifiers (QCIs) corresponding to the different time slices;

determining, based on the characteristic information and the QoS information of the service data flow, a configuration parameter corresponding to a data packet of the service data flow; and sending the data packet to a terminal device based on the configuration parameter.

11. The communication apparatus according to claim 10, wherein the characteristic information comprises a time period, at least two time slices corresponding to the time period, and bit rates corresponding to the at least two time slices, the QoS information comprises a QFI and QCIs corresponding to the at least two time slices, the QCIs corresponding to the at least two time slices are not completely the same, and there is a mapping relationship between the service data flow and a QoS flow corresponding to the QFI; and the operations of determining, based on the characteristic information and the QoS information of the service data flow, the configuration parameter corresponding to the data packet of the service data flow further comprise:

determining, based on the characteristic information of the service data flow and a first bit rate of the data packet of the service data flow, a first time slice that is in the at least two time slices and that corresponds to the first bit rate; determine a first QCI corresponding to the first time slice in the QCIs corresponding to the at least two time slices; and determine that a configuration parameter corresponding to the first QCI is the configuration parameter corresponding to the data packet of the service data flow.

12. The communication apparatus according to claim 11, wherein the program further comprises instructions that, when executed by the processor, cause the session management network element to perform: determine, based on reported channel state information CSI, a sending occasion and a subcarrier that are occupied for sending the data packet; and the operations of sending further comprise:

sending, based on the configuration parameter corresponding to the first QCI, the data packet to the terminal device at the sending occasion occupied by the data packet and on the subcarrier occupied by the data packet.

13. The communication apparatus according to claim 12, wherein the program further comprises instructions that, when executed by the processor, cause the apparatus to perform the operations:

sending configuration information to the terminal device, wherein the configuration information comprises indication information and the time period, and the indication information indicates that a period of reporting the channel state information CSI by the terminal device is the same as the time period; and receiving the CSI from the terminal device.

14. The communication apparatus according to claim 12, wherein the program further comprises instructions that, when executed by the processor, cause the apparatus to perform the operations:

determining arrival time of the data packet based on the time period;

sending downlink control information DCI to the terminal device in second duration before a moment at which the data packet arrives, wherein the DCI indicates the terminal device to report the CSI; and receiving the CSI from the terminal device.

15. The communication apparatus according to claim 11, wherein the configuration parameter comprises one or more of the following information: a sending rate, a packet loss rate, a packet delay budget, or a priority.

16. A communication system, comprising an access network device and a session management network element, wherein the session management network element is configured to send characteristic information of a service data flow and quality of service (QOS) information of the service data flow to the access network device, wherein the characteristic information of the service data flow indicates traffic characteristic information corresponding to different time slices within the service data flow in a time period, and the QoS information indicates QoS class identifiers (QCIs) corresponding to the different time slices; and the access network device is configured to:

receive the characteristic information of the service data flow and the QoS information of the service data flow from the session management network element;

determine, based on the characteristic information and the QoS information of the service data flow, a configuration parameter corresponding to a data packet of the service data flow; and send the data packet to a terminal device based on the configuration parameter.

17. The communication system according to claim 16, wherein the characteristic information comprises a time period, at least two time slices corresponding to the time period, and bit rates corresponding to the at least two time slices, the QoS information comprises a QFI and QCIs corresponding to the at least two time slices, the QCIs corresponding to the at least two time slices are not completely the same, and there is a mapping relationship between the service data flow and a QoS flow corresponding to the QFI; and the access network device is configured to determine, based on the characteristic information and the QoS information of the service data flow, a configuration parameter corresponding to a data packet of the service data flow comprises:

determine, based on the characteristic information of the service data flow and a first bit rate of the data packet of the service data flow, a first time slice that is in the at least two time slices and that corresponds to the first bit rate;

determine a first QCI corresponding to the first time slice in the QCIs corresponding to the at least two time slices; and determine that a configuration parameter corresponding to the first QCI is the configuration parameter corresponding to the data packet of the service data flow.

18. The communication system according to claim 17, wherein the access network device is further configured to:

determine, based on reported channel state information CSI, a sending occasion and a subcarrier that are occupied for sending the data packet; and wherein the access network device is configured to send the data packet to a terminal device based on the configuration parameter comprises:

send, based on the configuration parameter corresponding to the first QCI, the data packet to the terminal device at the sending occasion occupied by the data packet and on the subcarrier occupied by the data packet.

19. The communication system according to claim 16, wherein the characteristic information of the service data flow is from an application server;

the characteristic information of the service data flow is from a database, and the characteristic information of the service data flow in the database is from an application server; or the characteristic information of the service data flow is from a session management network element, and the characteristic information of the service data flow in the session management network element is from an application server.

20. The communication system according to claim 16, wherein the configuration parameter comprises one or more of the following information: a sending rate, a packet loss rate, a packet delay budget, or a priority.

* * * * *